United States Patent
Dourra et al.

(10) Patent No.: US 7,128,678 B2
(45) Date of Patent: Oct. 31, 2006

(54) TRANSMISSION SYSTEM GEAR SHIFT SELECTION AND CONTROL

(75) Inventors: Hussein A Dourra, Bloomfield, MI (US); Robert T Snow, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 150 days.

(21) Appl. No.: 10/913,901

(22) Filed: Aug. 6, 2004

(65) Prior Publication Data

US 2006/0027037 A1    Feb. 9, 2006

(51) Int. Cl.
    *F16H 31/00*    (2006.01)
(52) U.S. Cl. ...................................... 475/123
(58) Field of Classification Search ................ 477/144, 477/149, 133, 132; 475/123
    See application file for complete search history.

(56) References Cited

U.S. PATENT DOCUMENTS

| 4,875,391 A | 10/1989 | Leising et al. |
| 4,944,200 A | 7/1990 | Benford et al. |
| 5,401,219 A * | 3/1995 | Kimura et al. ............... 475/120 |
| 5,707,318 A * | 1/1998 | Shimei et al. ............... 477/133 |
| 6,010,428 A * | 1/2000 | Hoshiya et al. ............. 477/148 |
| 6,287,238 B1 * | 9/2001 | Park ........................... 477/143 |

* cited by examiner

*Primary Examiner*—Dirk Wright
(74) *Attorney, Agent, or Firm*—Ralph E. Smith

(57) ABSTRACT

A transmission includes an input shaft, an output shaft, a first plurality of gears, a second plurality of gears, and a series of engagement elements operable between an engaged position and a disengaged position. A controller is further provided to selectively toggle the series of engagement elements between the engaged position and the disengaged position to selectively couple one of the first plurality of gears or one of the second plurality of gears to the input shaft and the output shaft. The series of engagement elements sequentially couples the first plurality of gears to the input shaft and the output shaft during operation of the transmission and selectively couples one of the first plurality of gears or the second plurality of gears to the input shaft and the output shaft during a downshift operation of the transmission.

12 Claims, 3 Drawing Sheets

| GEAR | RATIO | ELEMENTS APPLIED | | | | | | | |
|---|---|---|---|---|---|---|---|---|---|
| | | A | B | C | D | E | F | G | H |
| 1 | 4.127 | X | | | | X | X | | X |
| 2' | 2.842 | X | | | | X | | X | |
| 2 | 2.284 | X | | | X | | X | | X |
| 3' | 1.573 | X | | | X | | | X | |
| 3 | 1.452 | X | X | | | | X | | X |
| 4/4' | 1.000 | X | X | | | | | X | |
| 5 | 0.638 | | X | | X | | | X | |
| R | 3.215 | | | X | | X | X | | |

TORQUE DROP

| GEAR CHANGE | PREVIOUS GEAR TORQUE/ NEW GEAR TORQUE | CALCULATED TORQUE |
|---|---|---|
| 1-2 | 4.127/2.28 | 1.810087719 |
| 2-3 | 2.28/1.45 | 1.572413793 |
| 3-4 | 1.45/1.0 | 1.45 |
| 4-5 | 1.0/0.69 | 1.449275362 |

TRANSMISSION SYSTEM GEAR SHIFT SELECTION AND CONTROL

FIELD OF THE INVENTION

The present invention relates to transmissions and more particularly to an automatic five-speed transmission incorporating additional gear sets to improve drivability and performance.

BACKGROUND OF THE INVENTION

Generally conventional automatic transmissions include a torque converter to transfer engine torque from an engine to an input of the transmission, planetary gearsets that provide various gear ratios of torque and thus various drive speeds, and fluid pressure-operated, multi-plate drive or brake clutches and/or brake bands that are connected to the individual elements of the planetary gearsets in order to perform gear shifts between the various gear ratios.

In addition, conventional automatic transmissions include one-way clutches that cooperate with the multi-plate clutches to optimize power shifts and a transmission controller for selectively applying and releasing elements to shift the gears. For example, the controller chooses the proper gear depending on system conditions such as the shift-program selected by the driver (i.e., Drive, Reverse, Neutral, etc.), the accelerator position, the engine condition, and the vehicle speed.

As an accelerator is further depressed, and the vehicle increases speed, the controller disengages and engages appropriate clutches to sequentially shift up through each of the gears until the highest (e.g., fifth) gear is engaged. Once a gear is engaged, further depression of the accelerator will cause the controller to operate a downshift of the transmission such that a lower gear is chosen. In so doing, the controller will shift down through the gears sequentially. In other words, the transmission will run through each of the next successively lower gears prior to reaching the lowest desired gear.

Thus, conventional transmissions suffer from the disadvantage of requiring sequential movement through each of the gears in the transmission. Furthermore, conventional transmissions suffer from the disadvantage of limiting gear choices to only those gears in the sequential chain.

Therefore, a transmission having both a sequential gear set and an alternate gear set capable of providing additional gear ratios is desirable in the industry. Furthermore, a transmission having a controller capable of shifting between the sequential gear set and the additional gear set, to provide the transmission and vehicle with the optimum gear selection, is also desirable.

SUMMARY OF THE INVENTION

Accordingly, an automatic transmission for a vehicle including an input shaft, an output shaft, a first plurality of gears, a second plurality of gears, and a series of engagement elements operable between an engaged position and a disengaged position is provided. A controller is further provided to selectively toggle the series of engagement elements between the engaged position and the disengaged position to selectively couple one of the first plurality of gears or one of the second plurality of gears to the input shaft and the output shaft. The series of engagement elements are operated to sequentially couple the first plurality of gears to the input shaft and the output shaft during operation of the transmission, and to selectively couple one of the first plurality of gears or the second plurality of gears to the input shaft and the output shaft during a downshift operation of the transmission based on vehicle operating conditions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

With reference to the figures, a transmission 10 is shown having a sequential gear set 12, an alternate gear set 14, and a series of engagement elements 16. The engagement elements 16 selectively engage respective gears of the sequential gear set 12 and alternate gear set 14 to provide the transmission 10 with an optimum gear ratio, as will be discussed further below.

Figure 1:
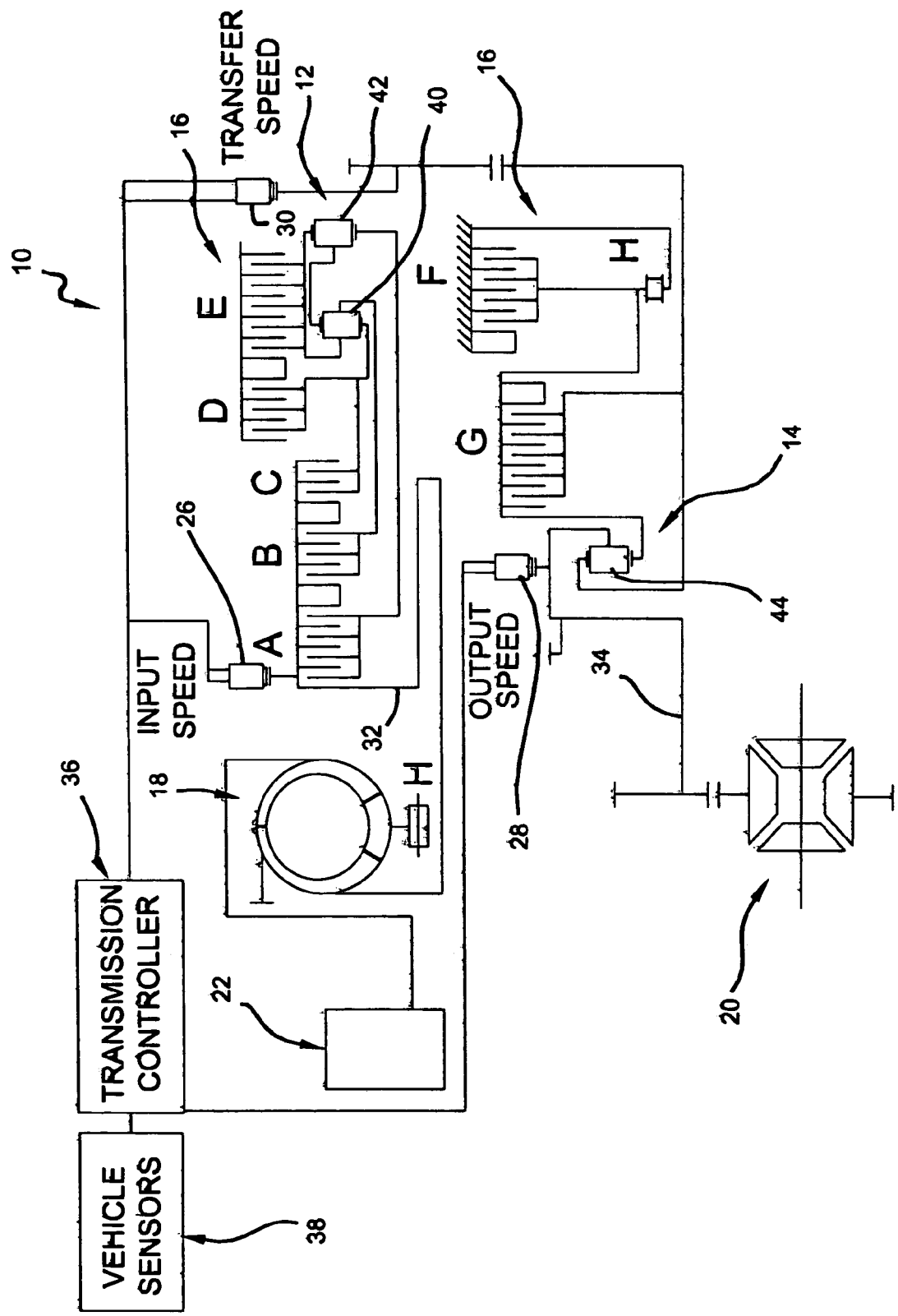
FIG. 1 is a schematic representation of a transmission in accordance with the principals of the present invention.

With particular reference to FIG. 1, the transmission 10 is shown operably connected to a torque converter 18 and a differential 20. The torque converter 18 is a fluid coupling between a power plant 22, such as, but not limited to, a combustion engine and the transmission 10 and serves to transmit a rotational force from the power plant 22 to the transmission 10. The rotational force received from the power plant 22 via torque converter 18 is then used to drive a combination of the sequential gears 12 and/or alternate gears 14 to provide a desired output of the transmission 10. The output of the transmission 10 is received by the differential 20 for use in driving one or more wheels of a vehicle (not shown) at a desired acceleration and speed.

The transmission 10 further includes an input sensor 26, an output sensor 28, and a transfer sensor 30 that monitor operating conditions of the transmission 10. The input sensor 26 monitors a rotational speed of an input shaft 32, which is generally indicative of the rotational speed of an output of the torque converter 18, while the output sensor 28 serves to monitor a rotational speed of an output shaft 34 of the transmission 10. The transfer sensor 30 monitors a speed of rotation of an output of the sequential gears 12 for use in determining whether to engage one of the alternate gears 14 to optimize transmission output during a downshift operation, as will be discussed further below.

Each of the sensors 26, 28, 30 is connected to a transmission controller 36 and provides the controller 36 with operating conditions of the transmission 10. The transmission controller 36 uses the operating data in conjunction with vehicle data received from vehicle sensors 38 in an effort to determine an optimum gear ratio for the transmission 10. Vehicle sensors 38 monitor vehicle speed and operator inputs such as braking and acceleration. Selection of the optimum gear ratio provides the differential 20 with an appropriate input via output shaft 34, and thus, enhances the performance of a vehicle to which the transmission 10 may be tied. While the vehicle sensors 38 are described as monitoring vehicle speed, braking, and acceleration, it should be understood that such parameters are exemplary in nature and are therefore not limited as such. Other vehicle operating parameters having bearing on transmission gear selection such as braking and wheel speed are considered within the scope of the present teachings.

The controller 36 adjusts the engagement elements 16 to selectively apply different gears from the sequential and alternate sets 12, 14 to provide the transmission 10 with an optimum output. As will be described further below, the controller 36 compares current operating conditions of the transmission (i.e., data received from sensors 26, 28, 30) with current vehicle operating conditions (i.e., data received from vehicles sensors 38) to determine an optimum gear ratio, and thus, an optimum transmission output.

Figures 2, 3:
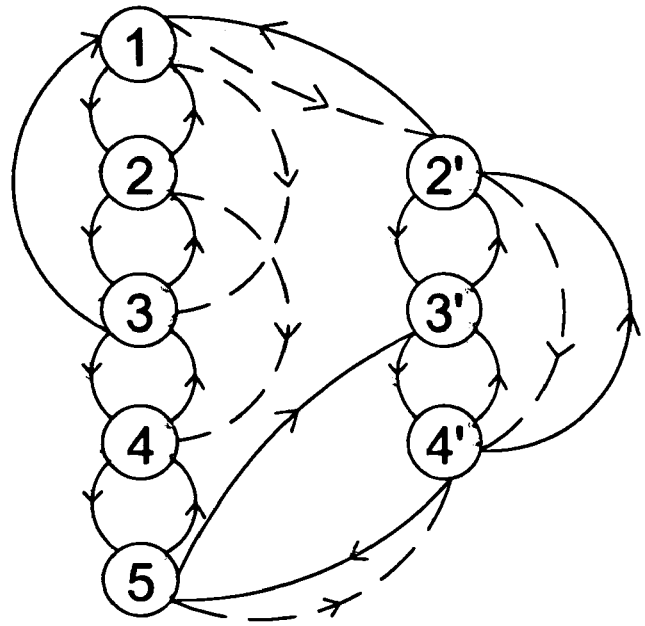
FIG. 2 is a schematic representation of a gear selection sequence for the transmission of FIG. 1.
FIG. 3 is a table showing gear ratio combinations for the transmission of FIG. 1 and the requisite clutch combinations required to achieve a particular gear ratio.

The sequential gear set 12 includes a first and second planetary gear set 40, 42 while the alternate gear set 14 includes a third planetary gear set 44, as best shown in FIG. 1. The planetary gears 40, 42 and 44 provide the transmission 10 with seven different gears and a reverse gear. The engagement elements 16 include a series of individual clutches A–G and an additional "overrunning" clutch H, which are selectively engaged to provide the transmission 10 with a number of different gear ratios. Specifically, the controller 36, based on current operating conditions of the vehicle and the transmission 10, selectively applies respective clutches A–H to engage varying combinations of planetary gears 40, 42, 44. As best shown in FIG. 3, clutches F and H are seemingly applied at the same time to achieve respective gears. However, it should be understood that clutch H is a so-called "overrunning" clutch and is therefore only needed when the transmission 10 experiences a positive torque. Conversely, when the transmission 10 experiences negative torque, clutch F is required to provide a desired ratio and the overrunning clutch H is disengaged.

With reference to FIGS. 2–3, the operation of the transmission 10 will be described in detail. When vehicle is at idle, the torque converter 18 freely spins without transmitting a rotational force to the transmission 10 from the power plant 22 (i.e., in a braked or neutral condition). However, once enabled and in a drive mode, a user depresses an accelerator (not shown), the vehicle sensor 38 sends a signal indicative thereof to the transmission controller 36. As shown in FIG. 3, the controller 36 engages clutch A, E, and F so that the lowest, or first gear combination 1, is selected (each selection represented by an "X" in FIG. 3). The lowest gear 1 includes the highest gear ratio (i.e., 4.127), and thus, provides the vehicle with the most torque. As can be appreciated, a higher torque value is desirable in that it provides the vehicle with the greatest acceleration from a rest position.

Once a predetermined speed is achieved, the controller 36 will release clutch E and engage clutch D, as best shown in FIG. 3. At this point the transmission 10 has shifted sequentially from first gear 1 to second gear 2 and has shifted to a lower gear ratio (i.e., 4.127 to 2.284). The second gear 2 includes a lower gear ratio, and thus, provides less torque to the output shaft 34. However, it should be noted that while torque is sacrificed, efficiency is improved, as less torque is required to propel the vehicle once the vehicle is in motion. The reduction in torque provides the vehicle with an increase in efficiency by reducing fuel consumption.

The controller 36 will sequentially move through each of the first five forward gears 1–5 by selectively engaging and releasing clutches A–H until the fifth gear 5 is achieved, as best shown in FIG. 3. The fifth gear 5 is achieved when clutch B, D, and G are engaged and provides the transmission 10 with the lowest torque and the lowest gear ratio (i.e., 0.689). Again, the fifth gear 5 is the highest gear and is engaged when the vehicle is moving at a relatively high speed. Therefore, even though the fifth gear 5 includes a low torque value, a high torque value is not required to propel the vehicle because the vehicle is already in motion, as previously discussed. In this manner, the reduced torque value improves efficiency by choosing the highest gear with the lowest ratio.

At this point, the controller 36 has selectively engaged clutches A–H to sequentially move through each of the first five gears 1–5 until the fifth gear 5 with a gear ratio of 0.689 is selected, as best shown in FIG. 2. At this point, if acceleration is required, the vehicle sensor 38 will send a signal to the controller 36 to downshift the transmission 10.

During a downshift operation, the controller 36 compares vehicle operating conditions to current transmission operating conditions and selects an optimum lower gear to accommodate the requisite acceleration. If the transmission is in the fifth gear 5, the controller 36 has two options from which to choose. First, if the desired acceleration is only slightly higher than the current output of the transmission, the controller 36 will engage the fourth gear 4. However, if the desired acceleration exceeds a predetermined threshold indicative of the need for significantly greater acceleration than the current output of the transmission 10 (i.e., high acceleration downshift), the controller 36 will select an alternate gear 3' from the alternate set 14.

The alternate gear 3' has a gear ratio of 1.573, which is significantly higher than the gear ratio provided by sequential gears 4 and 5 (1.0 and 0.689, respectively). In this regard, gear 3' provides the transmission 10 with additional torque, and therefore, additional performance. The additional torque allows for an increase in acceleration and thus allows the vehicle to reach a higher speed quicker than if the transmission 10 were to sequentially move through sequential gears 4 and 3 to finally achieve a gear ratio of 1.452. It should be noted that the ratio of sequential gear 3 (i.e., 1.452) is still less than the ratio achieved by engaging alternate gear 3' (i.e., 1.573), and therefore, alternate gear 3' allows the transmission 10 to provide higher torque for the desired acceleration. As best shown in FIG. 2, once the controller 36 selects gear 3', the controller 36 must then choose the next gear from one of the other two gears 2', 4' provided by the alternate set 14.

For example, if the controller 36 receives information from the vehicle sensor 38 that additional torque is required, the controller 36 will further downshift the transmission 10 from the third alternate gear 3' to the second alternate gear 2' to provide the transmission 10 with yet a higher gear ratio. Specifically, the controller 36 will disengage clutch D and engage clutch E such that clutches A, E, and G are engaged and the transmission has a gear ratio of 2.842, as best shown in FIG. 3. However, if the controller 36 does not receive an input requiring additional torque, the controller 36 will select the fourth alternate gear 4' once the vehicle reaches a predetermined speed. Specifically, the controller 36 will disengage clutch D and engage clutch B such that clutches A, B, and G are engaged and the transmission has a gear ratio of 1.0.

In any of the foregoing relationships, it should be noted that the controller 36 is only required to engage and release a single pair of clutches A–H to move either within the sequential gear set 12, within the alternate gear set 14, or between the sequential and alternate gear sets 12, 14. In this manner, the control of the transmission 10 is simplified and the overall performance of the transmission 10 is improved.

For example, when the transmission 10 is in alternate gear 4', the controller 36 can shift the transmission 10 into high gear 5 by simply releasing clutch A and engaging clutch D, as best shown in FIG. 3. While the previous description illustrates an exemplary shift sequence/operation, FIGS. 2 and 3 represent each of the possible shift combinations with solid lines and arrowheads indicating shifts and downshifts and broken lines indicating an incomplete shift. Incomplete shifts may occur if a driver begins to accelerate, but then releases the accelerator prior to the transmission 10 fully completing the shift. In this case, the incomplete shift simply returns the transmission 10 to the previous gear, as best shown in FIG. 2.

The controller 36 is able to receive the signals from the respective transmission and vehicle sensors 26, 28, 30, 38 and choose the appropriate gear combination to optimize performance of both the transmission 10 and the vehicle. Specifically, the controller 36 improves the performance, drivability, and fuel efficiency of the vehicle by appropriately selecting gears from the sequential set 12 or the alternate set 14 based on vehicle and transmission operating conditions.

For example, when the transmission 10 is in the highest gear (i.e., sequential gear 5) and a down shift is required, the controller 36 may select a more gradual downshift by choosing sequential gear 4 when only a slight acceleration is required, thereby improving the fuel efficiency of the vehicle. However, the controller 36 may also select a more rapid downshift by choosing alternate gear 3' when a more immediate acceleration is required, thereby improving drivability and performance of the vehicle. In either event, the combination of the sequential gear set 12 and alternate gear set 14, allows the controller 36 to select five gears out of a total of seven available gears depending on the operating conditions of the vehicle and transmission, and therefore increases the overall performance and efficiency of both the vehicle and the transmission 10.

Figures 4, 5:
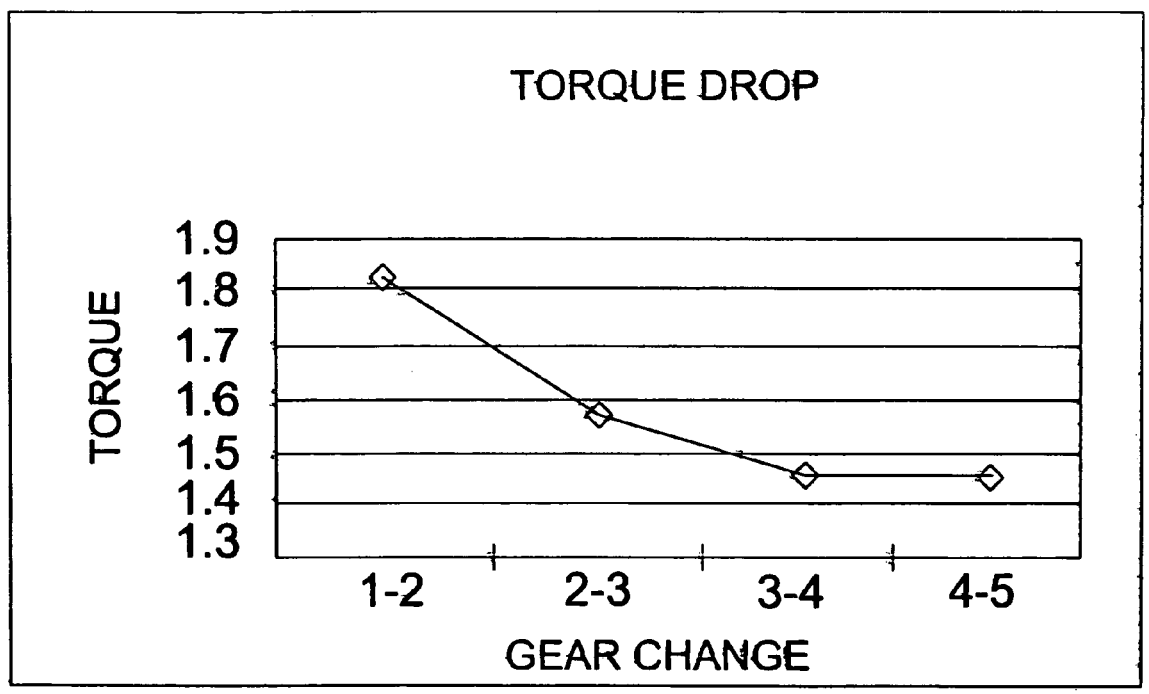
FIG. 4 is a table showing torque drop for a series of sequential gears.
FIG. 5 is a graphical representation of the torque drop from FIG. 4.

It should be noted that in selectively choosing gears from sets 12 and 14, that the controller 36 maintains a decreasing torque. For example, FIGS. 4 and 5 demonstrate an exemplary gear change moving through sequential gears 1–5. As best shown in FIG. 5, a torque drop is experienced as the controller 36 moves sequentially through the gears 1–5. The decreasing torque coincides with the increasing gears and provides vehicle occupants with pleasant and smooth shifts, and thus, a pleasant and smooth ride. It should be noted that while specific gear ratios have been used throughout the description, such ratios are exemplary in nature and are not intended to limit the present teachings. However, to ensure optimum transmission performance, a torque drop should be experienced similar to the drop shown in FIG. 5, regardless of the particular torque values of each individual gear as the gears increase.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automatic transmission for a vehicle comprising:
   an input shaft;
   an output shaft;
   a plurality of gears that cooperate to couple said input shaft to said output shaft to provide seven different gear ratios;
   a series of engagement elements operable between an engaged position and a disengaged position; and
   a controller operable to selectively toggle said series of engagement elements between said engaged position and said disengaged position to selectively couple at least one of said plurality of gears to said input shaft and said output shaft to achieve one of said seven gear ratios, said controller achieving a change in gear ratio from a current gear ratio by applying an additional single one of said series of engagement elements not currently applied and releasing a single one of said engagement elements currently applied;
   wherein said controller selects between eight different combinations of applied ones of said series of engagement elements to achieve one of said seven gear ratios based on operating conditions of at least one of the vehicle and the automatic transmission.

2. The automatic transmission of claim 1, wherein said engagement elements are clutch assemblies.

3. The automatic transmission of claim 2, wherein said clutch assemblies are multi-plate clutch assemblies.

4. The automatic transmission of claim 2, wherein said clutch assemblies include brake clutches.

5. The automatic transmission of claim 2, wherein said plurality of gears includes a first plurality of gears associated with a main gear set and a second plurality of gears associated with an auxiliary gear set.

6. The automatic transmission of claim 5, wherein at least one of said first plurality of gears couples said input shaft to said output shaft for five of said eight combinations and at least one of said second plurality of gears couples said input shaft to said output shaft for the other three of said eight combinations.

7. The automatic transmission of claim 5, wherein said auxiliary gear set includes a pair of said engagement elements for selectively coupling at least one of said second plurality of gears to said input shaft and said output shaft.

8. The automatic transmission of claim 7, wherein said pair of engagement elements are clutch assemblies.

9. The automatic transmission of claim 2, wherein said controller chooses one of said eight possible combinations of said series of engagement elements to achieve a desired one of said seven gear ratios based on said operating conditions and the current one of said eight possible combinations of said series of engagement elements.

10. A method for controlling operation of an automatic transmission of a vehicle comprising:
    detecting operating conditions of at least one of the vehicle and the automatic transmission;
    determining one of a downshift operation or an upshift operation is required based on said detected operating conditions;

selecting a desired gear ratio from amongst six other gear ratios to achieve said downshift operation or said upshift operation based on said detected operating conditions;

determining which of a series of engagement elements are currently applied that provide the current gear ratio of the automatic transmission;

selecting another combination of engagement elements from amongst seven other possible combinations of applied engagement elements based on said detected operating conditions and said current combination of engagement elements;

releasing one of said series of engagement elements currently applied; and applying another of said series of engagements elements not currently applied to achieve said desired gear ratio.

11. The method of claim 10, wherein said application of said engagement elements includes applying a force on a multi-plate clutch assembly.

12. The method of claim 10, wherein said detecting operating conditions of the transmission includes detecting a rotational speed of a transmission input and a transmission output.

* * * * *